(12) United States Patent
Wang et al.

(10) Patent No.: US 12,175,620 B1
(45) Date of Patent: Dec. 24, 2024

(54) SYSTEMS AND METHODS FOR ARRANGING AND DISPLAYING CLOTHING PATTERNS

(71) Applicant: ZHEJIANG LINGDI DIGITAL TECHNOLOGY CO., LTD., Zhejiang (CN)

(72) Inventors: Huamin Wang, Hangzhou (CN); Chen Liu, Hangzhou (CN)

(73) Assignee: ZHEJIANG LINGDI DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/422,284

(22) Filed: Jan. 25, 2024

Related U.S. Application Data

(63) Continuation of application No. PCT/CN2024/070369, filed on Jan. 3, 2024.

(51) Int. Cl.
*G06T 19/20* (2011.01)
*G06T 7/70* (2017.01)

(52) U.S. Cl.
CPC ............... *G06T 19/20* (2013.01); *G06T 7/70* (2017.01); *G06T 2207/20092* (2013.01); *G06T 2207/30196* (2013.01); *G06T 2210/16* (2013.01); *G06T 2219/2016* (2013.01); *G06T 2219/2021* (2013.01)

(58) Field of Classification Search
CPC . G06T 19/20; G06T 7/70; G06T 2207/20092; G06T 2207/30196; G06T 2210/16; G06T 2219/2016; G06T 2219/2021
See application file for complete search history.

(56) References Cited

U.S. PATENT DOCUMENTS

| 10,223,830 | B2 | 3/2019 | Bonner et al. | |
|---|---|---|---|---|
| 11,094,115 | B2 | 8/2021 | Ju | |
| 11,417,039 | B2* | 8/2022 | Oh | G06T 11/60 |
| 2019/0304182 | A1 | 10/2019 | Oh | |
| 2021/0056767 | A1* | 2/2021 | Oh | G06V 40/103 |

(Continued)

FOREIGN PATENT DOCUMENTS

| CN | 105513135 A | 4/2016 |
|---|---|---|
| CN | 106204723 A | 12/2016 |

(Continued)

OTHER PUBLICATIONS

Encoder ("How to Place Patterns onto the Avatar", 2022, https://www.youtube.com/watch?v=YB7FLKgtMKs) (Year: 2022).*

(Continued)

*Primary Examiner* — Xin Sheng
(74) *Attorney, Agent, or Firm* — METIS IP LLC

(57) ABSTRACT

A method and a user device for arranging clothing patterns may be provided. A first user instruction may be received. The first user instruction may be used for selecting a first target location from a two-dimensional (2D) clothing pattern and allocating the 2D clothing pattern to a second target location on a three-dimensional (3D) avatar. In response to the first user instruction, the 2D clothing pattern may be represented as a 3D clothing pattern that warps around the 3D avatar at the second target location.

20 Claims, 9 Drawing Sheets

(56) References Cited

U.S. PATENT DOCUMENTS

2023/0252747 A1     8/2023  Meador et al.
2023/0306699 A1 *   9/2023  Liang .................... A41H 3/007

FOREIGN PATENT DOCUMENTS

CN      106384381 A     2/2017
CN      115908701 A     4/2023

OTHER PUBLICATIONS

International Search Report in PCT/CN2024/070369 mailed on Aug. 8, 2024, 3 pages.
Written Opinion in PCT/CN2024/070369 mailed on Aug. 8, 2024, 4 pages.

* cited by examiner

300

┌─────────────────────────────────────────┐
│ Receiving a first user instruction for selecting a first
│ target location from a 2D clothing pattern and          — 310
│ allocating the 2D clothing pattern to a second target
│ location on a 3D avatar
└─────────────────────────────────────────┘
                    ↓
┌─────────────────────────────────────────┐
│ In response to the first user instruction, representing
│ the 2D clothing pattern as a 3D clothing pattern that   — 320
│ warps around the 3D avatar at the second target
│ location
└─────────────────────────────────────────┘

SYSTEMS AND METHODS FOR ARRANGING AND DISPLAYING CLOTHING PATTERNS

CROSS-REFERENCE TO RELATED APPLICATIONS

This application is a continuation of International Application No. PCT/CN2024/070369, filed on Jan. 3, 2024, the contents of which is hereby incorporated by reference.

TECHNICAL FIELD

The present disclosure relates to the field of fashion design, and in particular, to systems and methods for arranging and displaying clothing patterns.

BACKGROUND

Clothing design technology via computer software usually involves generating a virtual 3D clothing by arranging clothing patterns on a three-dimensional (3D) avatar (e.g., a 3D human body model). The clothing design technology is highly efficient and brings great convenience to users, so it has been widely used in various areas. As a representative application, a professional fashion designer can design clothing via the computer software. As another representative application, the computer software can provide a user-oriented clothing service using virtual 3D clothing, which enables a user to try on clothes on-line or customizing clothes.

SUMMARY

According to an aspect of the present disclosure, a method for arranging clothing patterns. The method may be implemented on a user terminal having at least one processor and at least one storage device. The method may include receiving a first user instruction for selecting a first target location from a two-dimensional (2D) clothing pattern and allocating the 2D clothing pattern to a second target location on a three-dimensional (3D) avatar. In response to the first user instruction, the method may further include representing the 2D clothing pattern as a 3D clothing pattern that warps around the 3D avatar at the second target location.

In some embodiments, the method may further include displaying a plurality of candidate 2D clothing patterns for user selection.

In some embodiments, the method may further include receiving a second user instruction for adjusting the 3D clothing pattern. In response to the second user instruction, the method may further include displaying an adjusted 3D clothing pattern.

In some embodiments, the method may further include displaying a 3D virtual clothing worn on the 3D avatar. The 3D virtual clothing may be generated by sewing the 3D clothing pattern and one or more other 3D clothing patterns that warp around the 3D avatar.

In some embodiments, the method may include receiving a third user instruction for setting distance information between the 3D clothing pattern and the 3D avatar. The 3D clothing pattern may be represented based on the distance information.

In some embodiments, the second target location may be freely selected by a user on the 3D avatar.

In some embodiments, the 2D clothing pattern may be represented by a geometric pattern. The method may include determining positions of vertices of the geometric pattern on the 3D avatar based on the first target location and the second target location. The method may further include representing the 2D clothing pattern as the 3D clothing pattern by translating the vertices of the geometric pattern based on the positions of the vertices.

In some embodiments, the positions of the vertices of the geometric pattern on the 3D avatar may be determined by solving an optimization function. The optimization function may at least include a first optimization term or a first constraint term relating to a difference between the distance from the position of each vertex to the 3D avatar and a desired distance corresponding to the vertex.

In some embodiments, the desired distance corresponding to each vertex may be determined based on at least one of a type of the 2D clothing pattern, a body part of the 3D avatar corresponding to the 2D clothing pattern, a body part of the 3D avatar corresponding to the vertex, or distance information between the 3D clothing pattern and the 3D avatar set by a user.

In some embodiments, the optimization function may further comprise a second optimization term or a second constraint term relating to the deformation of the 2D clothing pattern.

In some embodiments, the optimization function may further comprise a third optimization term or a third constraint term relating to a distance between the second target location and a position of a target vertex corresponding to the first target location.

In some embodiments, the optimization function may further comprise a fourth optimization term or a fourth constraint term relating to an orientation of the 3D clothing pattern.

In some embodiments, the positions of vertices of the geometric pattern on the 3D avatar may be determined based on the first target location and the second target location via a physical simulation method.

In some embodiments, the 2D clothing pattern may be represented by a geometric pattern. The method may include transmitting the first user instruction to a server. The method may also include receiving positions of vertices of the geometric pattern on the 3D avatar from the server. The method may further include representing the 2D clothing pattern as the 3D clothing pattern by translating the vertices of the geometric pattern based on the positions of the vertices.

In some embodiments, a front surface of the 3D clothing pattern may face outward.

According to another aspect of the present disclosure, a user device may be provided. The user device may at least one storage device storing a set of instructions for arranging clothing patterns and at least one processor configured to communicate with the at least one storage device. When executing the set of instructions, the at least one processor is configured to direct the user device to perform the following operations. The user device may receive a first user instruction for selecting a first target location from a 2D clothing pattern and allocating the 2D clothing pattern to a second target location on a 3D avatar. Further, in response to the first user instruction, the user device may represent the 2D clothing pattern as a 3D clothing pattern that warps around the 3D avatar at the second target location.

According to still another aspect of the present disclosure, a method for arranging clothing patterns. The method may be implemented on a server having at least one processor and at least one storage device. The method may include obtaining an instruction for selecting a first target location from a 2D clothing pattern and allocating the 2D clothing pattern to a second target location on a 3D avatar, the 2D clothing pattern being represented by geometric pattern. The method may also include determining positions of vertices of the geometric pattern on the 3D avatar based on the first target location and the second target location. The method may further include directing a user terminal to represent the 2D clothing pattern as a 3D clothing pattern that warps around the 3D avatar at the second target location based on the positions of the vertices.

In some embodiments, the instruction may be inputted by a user via a user terminal, and the second target location may be freely selected by the user.

In some embodiments, the instruction may be a computer-generated instruction, and the second target location may be determined by performing the operations. The method may include determining a body part of the 3D avatar corresponding to the 2D clothing pattern by processing boundary information of the 2D clothing pattern using a trained machine learning model. The method may further include determining the second target location on the 3D avatar based on the body part corresponding to the 2D clothing pattern.

In some embodiments, the method may include determining the positions of the vertices of the geometric pattern by solving an optimization function. The optimization function may at least include a first optimization term or a first constraint term relating to a difference between the distance from the position of each vertex to the 3D avatar and a desired distance corresponding to the vertex.

In some embodiments, the optimization function may further comprise a second optimization term or a second constraint term relating to the deformation of the 2D clothing pattern.

In some embodiments, the optimization function may further comprise a third optimization term or a third constraint term relating to a distance between the second target location and a position of a target vertex corresponding to the first target location.

In some embodiments, the optimization function may further comprise a fourth optimization term or a fourth constraint term relating to an orientation of the 3D clothing pattern.

In some embodiments, the method may further include determining a sewing relationship between the 3D clothing pattern and one or more other 3D clothing patterns that warp around the 3D avatar. The method may also include directing the user terminal to display a 3D virtual clothing worn on the 3D avatar. The 3D virtual clothing may be generated by sewing the 3D clothing pattern and the one or more 3D clothing patterns based on the sewing relationship.

According to still another aspect of the present disclosure, a server may be provided. The server may include at least one storage device storing a set of instructions for arranging clothing patterns and at least one processor configured to communicate with the at least one storage device. When executing the set of instructions, the at least one processor may be configured to direct the server to perform the following operations. The server may obtain an instruction for selecting a first target location from a 2D clothing pattern and allocating the 2D clothing pattern to a second target location on a 3D avatar, the 2D clothing pattern being represented by geometric pattern. The server may also determine positions of vertices of the geometric pattern on the 3D avatar based on the first target location and the second target location. Further, the server may direct a user terminal to represent the 2D clothing pattern as a 3D clothing pattern that warps around the 3D avatar at the second target location based on the positions of the vertices.

According to still another aspect of the present disclosure, a user terminal may be provided. The user terminal may include a receiving module and a representing module. The receiving module may be configured to receive a first user instruction for selecting a first target location from a 2D clothing pattern and allocating the 2D clothing pattern to a second target location on a 3D avatar. The representing module may be configured to represent the 2D clothing pattern as a 3D clothing pattern that warps around the 3D avatar at the second target location in response to the first user instruction.

According to still another aspect of the present disclosure, a server may be provided. The server may include an obtaining module, a determination module, and a directing module. The obtaining module may be configured to obtain an instruction for selecting a first target location from a 2D clothing pattern and allocating the 2D clothing pattern to a second target location on a 3D avatar, the 2D clothing pattern being represented by geometric pattern. The determination module may be configured to determine positions of vertices of the geometric pattern on the 3D avatar based on the first target location and the second target location. The directing module may be configured to direct a user terminal to represent the 2D clothing pattern as a 3D clothing pattern that warps around the 3D avatar at the second target location based on the positions of the vertices.

According to still another aspect of the present disclosure, a non-transitory computer readable medium may be provided. The non-transitory computer readable medium may comprise at least one set of instructions for arranging clothing patterns. When executed by one or more processors of a computing device, the at least one set of instructions causes the computing device to perform a method. The method may include receiving a first user instruction for selecting a first target location from a 2D clothing pattern and allocating the 2D clothing pattern to a second target location on a 3D avatar. In response to the first user instruction, the method may further include representing the 2D clothing pattern as a 3D clothing pattern that warps around the 3D avatar at the second target location.

According to still another aspect of the present disclosure, a non-transitory computer readable medium may be provided. The non-transitory computer readable medium may comprise at least one set of instructions for arranging clothing patterns. When executed by one or more processors of a computing device, the at least one set of instructions causes the computing device to perform a method. The method may include obtaining an instruction for selecting a first target location from a 2D clothing pattern and allocating the 2D clothing pattern to a second target location on a 3D avatar, the 2D clothing pattern being represented by geometric pattern. The method may also include determining positions of vertices of the geometric pattern on the 3D avatar based on the first target location and the second target location. The method may further include directing a user terminal to represent the 2D clothing pattern as a 3D clothing pattern that warps around the 3D avatar at the second target location based on the positions of the vertices.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 3 is a flowchart illustrating an exemplary process for arranging clothing patterns according to some embodiments of the present disclosure;

DETAILED DESCRIPTION

Figure 1A:
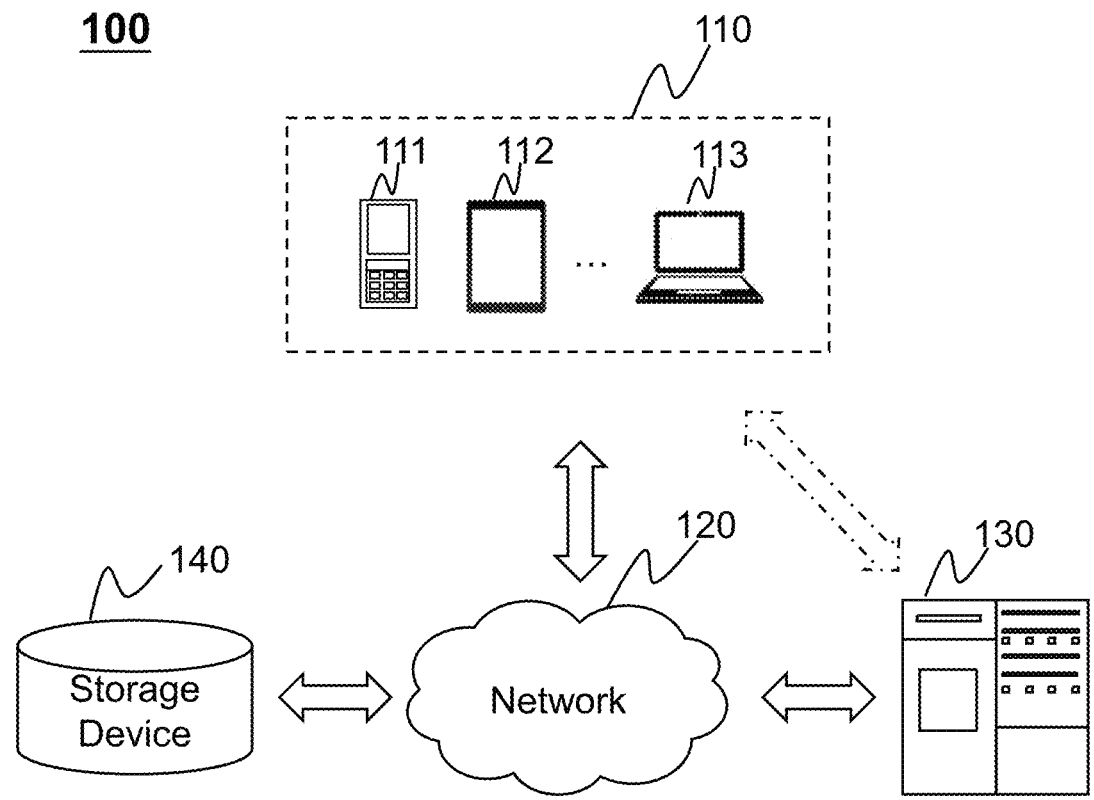
FIG. 1A is a schematic diagram illustrating an exemplary fashion design system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that, although the terms "first," "second," "third," "fourth," etc., may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module, or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise.

These and other features, and characteristics of the present disclosure, as well as the methods of operation and functions of the related elements of structure and the combination of parts and economics of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

In conventional clothing pattern arrangement approaches, when a user wants to sew clothing patterns on a 3D avatar, he/she can only assign a selected clothing pattern to a pre-defined body location of the 3D avatar. Since the amount of pre-defined body locations corresponding to the selected clothing pattern is relatively small, the body parts that the user can choose to arrange the clothing pattern are relatively limited. Moreover, the shape of the clothing pattern is determined by projecting the clothing pattern from a reference pattern space onto a pre-defined planar or cylindrical surface, which may cause unconformity between the clothing pattern and the 3D avatar, and self-intersection between clothing patterns.

To address the above problems, the present disclosure provides methods and systems for arranging clothing patterns. Specifically, a user terminal may receive a first user instruction for selecting a first target location from a two-dimensional (2D) clothing pattern and allocating the 2D clothing pattern to a second target location on a three-dimensional (3D) avatar. The second target location can be any location on the 3D avatar that is freely selected by the user. In response to the first user instruction, the user terminal may represent the 2D clothing pattern as a 3D clothing pattern that warps around the 3D avatar at the second target location.

For example, the 2D clothing pattern may be represented by geometric pattern (e.g., multiple meshes). The user terminal may determine positions of vertices of the geometric pattern on the 3D avatar based on the first target location and the second target location by, e.g., solving an optimization function. Further, the user terminal may represent the 2D clothing pattern as the 3D clothing pattern by translating the vertices of the geometric pattern based on the positions of the vertices.

Compared with the conventional clothing pattern arrangement approaches, the methods and systems of the present disclosure may allow the clothing pattern to be arranged on any location of the 3D avatar, which makes the arrangement of clothing pattern more flexible. Moreover, the methods and systems of the present disclosure may allow the 3D clothing pattern to tightly wrap around the 3D avatar, which may reduce the self-intersection between 3D clothing patterns.

FIG. 1A is a schematic diagram illustrating an exemplary fashion design system 100 according to some embodiments of the present disclosure. As shown in FIG. 1A, the fashion design system 100 may include a user terminal 110 (also referred to as a user device 110), a network 120, a server 130, and a storage device 140. In some embodiments, the user terminal 110, the server 130, and/or the storage device 140 may be connected to and/or communicate with each other via a wireless connection (e.g., the network 120), a wired connection, or a combination thereof. The connection between the components of the fashion design system 100 may be variable.

Figure 1B:
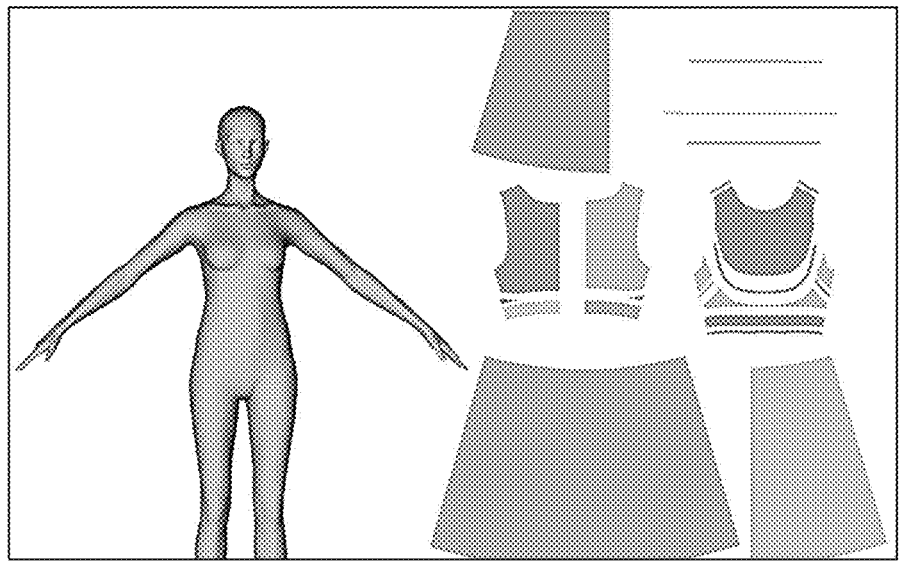
FIG. 1B is a schematic diagram illustrating exemplary information displayed on a user terminal according to some embodiments of the present disclosure.

The user terminal 110 may enable user interaction between a user and the fashion design system 100. For example, the user terminal 110 may receive user instructions input by the user (e.g., a user instruction for allocating a 2D clothing pattern to a 3D avatar). As another example, the user terminal 110 may display information relating to the fashion design system 100 to the user. For example, the user terminal 110 may display candidate 2D clothing patterns for user selection, a 3D avatar, a 3D clothing pattern wrapped around the 3D avatar, a parameter setting element for setting related parameters, a 3D virtual clothing, or the like, or any combination thereof. Merly by way of example, FIG. 1B is a schematic diagram illustrating exemplary information displayed on the user terminal 110 according to some embodiments of the present disclosure. As shown in FIG. 1B, the information displayed on the user terminal 110 includes candidate 2D clothing patterns and a 3D avatar.

In some embodiments, the terminal 110 may include a mobile device 111, a tablet computer 112, a laptop computer 113, or the like, or any combination thereof. In some embodiments, the user terminal 110 may include input/output components, such as a display. Exemplary displays may include a liquid crystal display (LCD), a light emitting diode (LED)-based display, a flat panel display or curved screen (or television), a cathode ray tube (CRT), a virtual reality device, an augmented reality device, or the like, or a combination thereof. In some embodiments, the user terminal 110 may be part of the server 130.

The network 120 may include any suitable network that can facilitate the exchange of information and/or data for the fashion design system 100. In some embodiments, one or more components of the fashion design system 100 (e.g., the user terminal 110, the server 130, the storage device 140) may communicate information and/or data with one or more other components of the fashion design system 100 via the network 120. For example, the server 130 may obtain instructions from the user terminal 110 via the network 120.

The server 130 may process data and/or information obtained from the user terminal 110, the storage device 140, or other components of the fashion design system 100. For example, the server 130 may determine information for arranging a 2D clothing pattern on a 3D avatar (e.g., positions of vertices of the 2D clothing pattern on the 3D avatar), and direct the user terminal 110 to represent the 2D clothing pattern as a 3D clothing pattern that warps around the 3D avatar.

In some embodiments, the server 130 may be a single server or a server group. In some embodiments, the server 130 may be local to or remote from the fashion design system 100. Merely for illustration, only one server 130 is described in the fashion design system 100. However, it should be noted that the fashion design system 100 in the present disclosure may also include multiple servers. Thus operations and/or method steps that are performed by one server 130 as described in the present disclosure may also be jointly or separately performed by the multiple servers. For example, if in the present disclosure the server 130 of the fashion design system 100 executes both process A and process B, it should be understood that the process A and the process B may also be performed by two or more different servers jointly or separately in the fashion design system 100 (e.g., a first server executes process A and a second server executes process B, or the first and second servers jointly execute processes A and B).

The storage device 140 may store data, instructions, and/or any other information. In some embodiments, the storage device 140 may store data obtained from the server 130, and/or the user terminal 110. For example, the storage device 140 may store clothing patterns and 3D avatars displayed by the user terminal 110. As another example, the storage device 130 may store design results. In some embodiments, the storage device 140 may store data and/or instructions that the server 130 and/or the user terminal 110 may execute or use to perform exemplary methods described in the present disclosure. In some embodiments, the storage device 140 may be a part of the server 130 or the user terminal 110.

It should be noted that the above description of the fashion design system 100 is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the fashion design system 100 may include one or more additional components. Additionally or alternatively, one or more components of the fashion design system 100 described above may be omitted. As another example, two or more components of the fashion design system 100 may be integrated into a single component.

Figure 2:
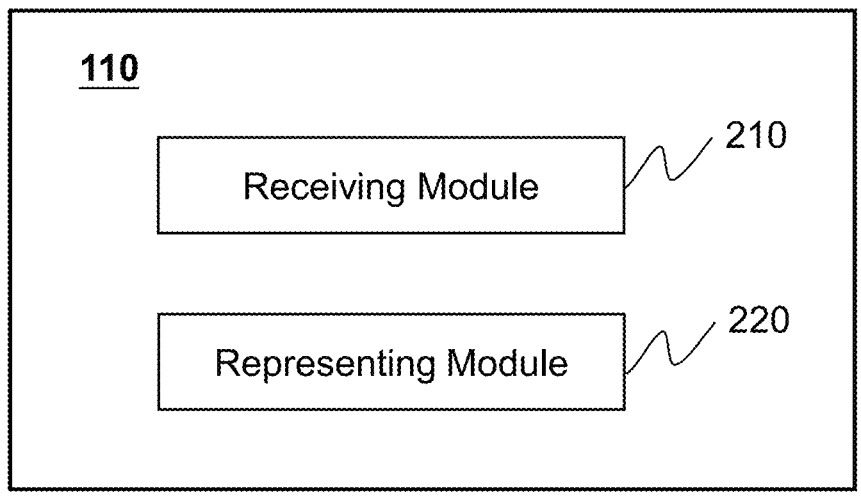
FIG. 2 is a block diagram illustrating an exemplary user terminal according to some embodiments of the present disclosure.

FIG. 2 is a block diagram illustrating an exemplary user terminal 110 according to some embodiments of the present disclosure.

As shown in FIG. 2, the user terminal 110 may include a receiving module 210 and a representing module 220.

The receiving module 210 may be configured to receive a first user instruction for selecting a first target location from a 2D clothing pattern and allocating the 2D clothing pattern to a second target location on a 3D avatar. More descriptions regarding the receiving of the first user instruction may be found elsewhere in the present disclosure. See, e.g., operation 310 in FIG. 3, and relevant descriptions thereof.

The representing module 220 may be configured to represent the 2D clothing pattern as a 3D clothing pattern that warps around the 3D avatar at the second target location in response to the first user instruction. More descriptions regarding the representing the 2D clothing pattern as the 3D clothing pattern may be found elsewhere in the present disclosure. See, e.g., operation 320 in FIG. 3, and relevant descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, any one of the modules may be divided into two or more units. For instance, the user terminal 110 may include one or more additional modules, such as a storage module (not shown) for storing data.

FIG. 3 is a flowchart illustrating an exemplary process 300 for arranging clothing patterns according to some embodiments of the present disclosure. In some embodiments, the process 300 may be implemented by the user terminal 110 of the fashion design system 100 illustrated in FIG. 1A. For example, the process 300 may be stored in a storage (e.g., the storage device 140, a storage device of the user terminal 110) as a form of instructions, and invoked and/or executed by a processor of the user terminal 110. The operations of the illustrated process presented below are intended to be illustrative. In some embodiments, the process 300 may be accomplished with one or more additional operations not described, and/or without one or more of the operations discussed. Additionally, the order in which the operations of the process 300 as illustrated in FIG. 3 and described below is not intended to be limiting.

As used herein, the term "arranging a clothing pattern" refers to a process of transforming a 2D clothing pattern into a 3D clothing pattern and dragging or covering the 3D clothing pattern on a 3D avatar.

In 310, the user terminal 110 (e.g., the receiving module 210) may receive a first user instruction for selecting a first target location from a 2D clothing pattern and allocating the 2D clothing pattern to a second target location on a 3D avatar.

As used herein, the 3D avatar refers to a 3D model of a subject, and the 2D clothing pattern refers to a virtual plane pattern representing a fabric piece for producing clothes. For example, a virtual clothing may be produced using multiple 2D clothing patterns and worn on the 3D avatar. In some embodiments, one or more features of the 2D clothing pattern may be adjusted according to needs. Exemplary features of the 2D clothing pattern may include a size, a shape, a material, or the like, or any combination. For example, a user may adjust the shape and/or size of the 2D clothing pattern via the user terminal 110 before he/she inputs the first user instruction.

The subject corresponding to the 3D avatar may include a human body or other animals. For illustration purposes, a human body is described as an example of the subject hereinafter.

In some embodiments, the 3D avatar may be a general human body model. In some embodiments, 3D avatars corresponding to different body types may be previously generated and stored in a storage device (e.g., the storage device 140 or an eternal storage device), and the 3D avatar may be selected from the storage device by the user of the user terminal 110. Exemplary body types may include a thin body type, a standard body type, an upper body obesity type, a lower body obesity type, a body type corresponding to female, a body type corresponding to male, or the like.

In some embodiments, the 3D avatar may be customized. For example, the 3D avatar may be a customized model that is designed according to information of the user (e.g., an image upload by the user).

In some embodiments, the 3D avatar may be rotatable. In some embodiments, one or more features of the 3D avatar may be adjusted by the user of the user terminal 110. Exemplary features of the 3D avatar may include a body shape, a posture, a size, or the like, or any combination thereof.

Figure 4A:
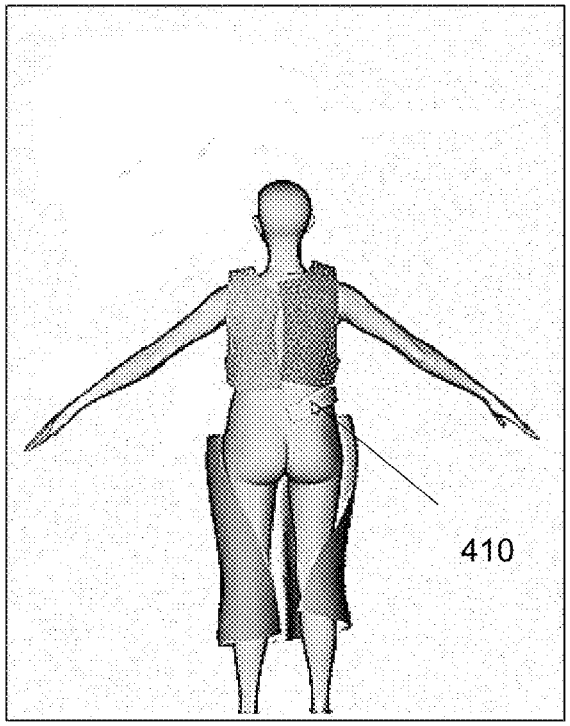
FIGS. 4A and 4B are schematic diagrams illustrating exemplary second target locations according to some embodiments of the present disclosure.
Figure 4B:
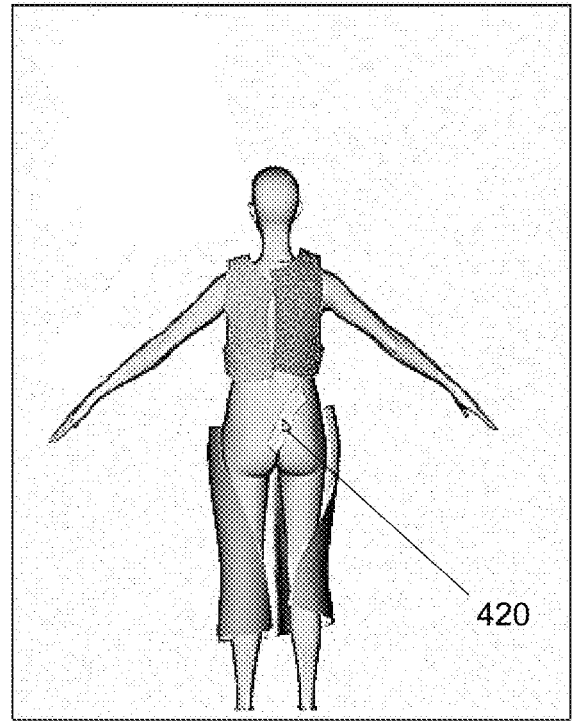

The first user instruction may be input by the user of the user terminal 110 for allocating the 2D clothing pattern to the 3D avatar. Specifically, the user selects the first target location on the 2D clothing pattern, and allocates or assigns the first target location to the second target location on the 3D avatar. The first target location may be any one location (e.g., a vertex, a center of a mesh, etc.) on the 2D clothing pattern freely selected by the user. The second target location may be any location on the 3D avatar freely selected by the user. For example, FIGS. 4A and 4B are schematic diagrams illustrating exemplary second target locations according to some embodiments of the present disclosure. As shown in FIG. 4A, the second target location is a location 410 at the waist of the 3D avatar. As shown in FIG. 4B, the second target location is a location 420 at the hip of the 3D avatar.

Figure 4C:
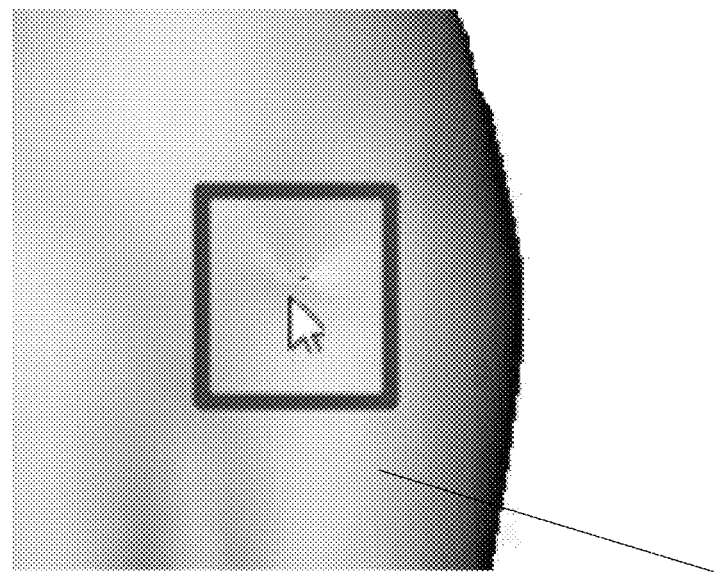
FIG. 4C is a schematic diagram illustrating exemplary physical wrinkles on a 2D clothing pattern 430 according to some embodiments of the present disclosure.

In some embodiments, the first user instruction may be inputted by the user via various manner. For example, the user may click a point (i.e., the first target location) on the 2D clothing pattern and drag the point to the second target location on the 3D avatar using a mouse. In some embodiments, when the user clicks the first target location on the 2D clothing pattern and/or drags the 2D clothing pattern, physical wrinkles may be generated near the first target location. For example, FIG. 4C is a schematic diagram illustrating exemplary physical wrinkles on a 2D clothing pattern 430 according to some embodiments of the present disclosure. As shown in FIG. 4C, when a user may click and drag a point (shown as a white arrow) on the 2D clothing pattern 430, physical wrinkles are generated near the point.

In some embodiments, before the first user instruction is inputted, the user terminal 110 may display a plurality of candidate 2D clothing patterns for user selection. The user may select the 2D clothing pattern that he/she desires to drape on the 3D avatar from the plurality of candidate 2D clothing patterns via an input device (e.g., a mouse).

In 320, in response to the first user instruction, the user terminal 110 (e.g., the representing module 220) may represent the 2D clothing pattern as a 3D clothing pattern that warps around the 3D avatar at the second target location.

Figure 5A:
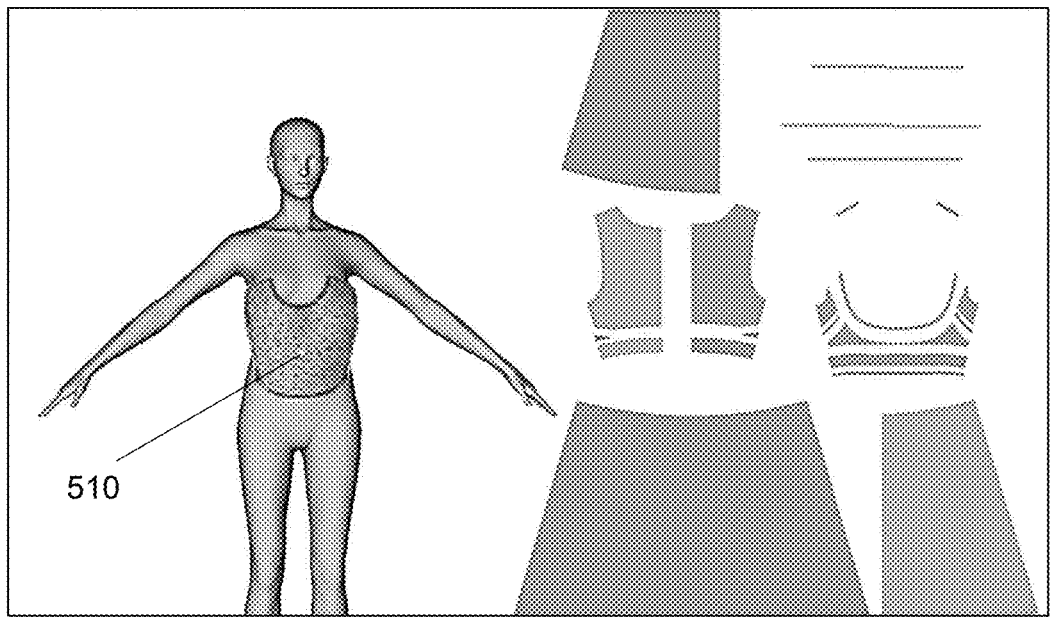
FIGS. 5A and 5B are schematic diagrams illustrating an exemplary 3D clothing pattern according to some embodiments of the present disclosure.

As used herein, the 3D clothing pattern refers to a virtual curved pattern (or a non-planar pattern) that warps around the 3D avatar. It can be understood that when the 2D clothing pattern is worn on the 3D avatar, the appearance of the 2D clothing pattern may change depending on the body shape of the 3D avatar, and becomes the 3D clothing pattern that conforms to and warps around the 3D avatar. For example, as shown in FIG. 5A, a 2D clothing pattern is represented as a 3D clothing pattern 510 that warps around the abdomen of the 3D avatar.

In some embodiments, the 2D clothing pattern may be represented by a geometric pattern. The geometric pattern may include multiple meshes. Exemplary meshes may include triangular meshes, quadrilateral meshes, or the like, or any combination thereof. In some embodiments, the user terminal 110 may transmit the first user instruction to a server (e.g., the server 130). In response to the first user instruction, the server may determine positions of vertices of the geometric pattern on the 3D avatar, and send the positions of the vertices to the user terminal 110. As used herein, a position of a vertex on the 3D avatar refers to a position of the vertex in a 3D coordinate system corresponding to the 3D avatar. Further, the user terminal 110 may receive the positions of the vertices of the geometric pattern on the 3D avatar from the server, and represent the 2D clothing pattern as the 3D clothing pattern by translating the vertices of the geometric pattern based on the positions of the vertices. For example, each vertex of the geometric pattern is moved to its corresponding position on the 3D avatar, and the 3D clothing pattern is instantly displayed as a piece covering the 3D avatar. In some embodiments, the server may generate the 3D clothing pattern by translating the vertices of the geometric pattern based on the positions of the vertices, and direct the user terminal 110 to display the 3D clothing pattern and the 3D avatar.

In some embodiments, the user terminal 110 may directly determine the positions of the vertices of the geometric pattern on the 3D avatar based on the first target location and the second target location, and represent the 2D clothing pattern as the 3D clothing pattern by translating the vertices of the geometric pattern based on the positions of the vertices. In some embodiments, the user terminal 110 may determine the positions of the vertices of the geometric pattern on the 3D avatar in a similar manner as how the server determine the positions of the vertices of the geometric pattern on the 3D avatar as described elsewhere in this disclosure. For example, the user terminal 110 may determine the positions of the vertices of the geometric pattern on the 3D avatar by solving an optimization function. More descriptions regarding the determination of the positions of the vertices of the geometric pattern on the 3D avatar may be found elsewhere in the present disclosure. See, e.g., operation 920 in FIG. 9 and relevant descriptions thereof.

In some embodiments, the positions of vertices of the geometric pattern on the 3D avatar may be determined based on the first target location and the second target location via a physical simulation method. The physical simulation method can construct a model of cloth based on physical characteristics of the cloth for simulating the process of stretching, bending, or compress, etc., the cloth. The physical simulation methods may include any suitable cloth simulation algorithms such as a simulation algorithm filtering (CSF) algorithm (e.g., a Laplacian-based CSF algorithm, a Moving Least Squares CSF algorithm, a Mean Value Coordinates CSF algorithm, etc.)

In some embodiments, when the 2D clothing pattern is represented as the 3D clothing pattern, the front surface of the 3D clothing pattern may face outward. The front surface of the 3D clothing pattern may be transformed from the front surface of the 2D clothing pattern. It can be understood that cloth normally has a back surface and a front surface, when worn on a user, the back surface is close to the user's body and cannot be seen, and the front surface is away from the user's body, and can be seen. Correspondingly, the 2D clothing pattern and the 3D clothing pattern both have front surfaces that simulate the front surface of actual cloth. In the process of representing the 2D clothing pattern as the 3D cloth pattern, the front surface of the 3D clothing pattern may face outward (i.e., away from the 3D avatar), so that the front surface of the 3D clothing pattern can be seen when it warps around the 3D avatar, and the shape of the 3D clothing pattern may not be stuck in a self-folded state. In some embodiments, a fourth optimization term or a fourth constraint term relating to an orientation of the 3D clothing pattern may be used to ensure that the front surface of the 3D clothing pattern faces outward. More descriptions regarding the fourth optimization term and a fourth constraint term may be found elsewhere in the present disclosure. See, e.g., FIG. 9 and relevant descriptions thereof.

In some embodiments, the user terminal 110 may receive a third user instruction for setting distance information between the 3D clothing pattern and the 3D avatar. The 3D clothing pattern may be represented based on the distance information. Specifically, as set forth, the 3D clothing pattern may be represented based on the positions of the vertices of the geometric pattern of the 2D clothing pattern on the 3D avatar. The positions of the vertices of the geometric pattern may be determined based on the distance information.

For example, the user terminal 110 may include a parameter setting element for setting different parameters. A user may set the distance information between the 3D clothing pattern and the 3D avatar on the parameter setting region via an input device (e.g., a mouse). The distance information set by the user may include a desired distance between the 3D clothing pattern and the 3D avatar (which will be described in detail in operation 920).

In some embodiments, the distance information may only include one distance between the 3D clothing pattern and the 3D avatar. In this case, the desired distance between any portion of the 3D clothing pattern and the 3D avatar may be the same. In some embodiments, the distance information may include distances between different portions of the 3D clothing pattern and the 3D avatar. In this case, the desired distances between different portions of the 3D clothing pattern and the 3D avatar may be different. For example, if the 3D clothing pattern represents a skirt, the desired distance between a part of the 3D clothing pattern close to the waist and the 3D avatar may be smaller than the desired distance between a part of the 3D clothing pattern close to the feet and the 3D avatar.

Figure 5B:
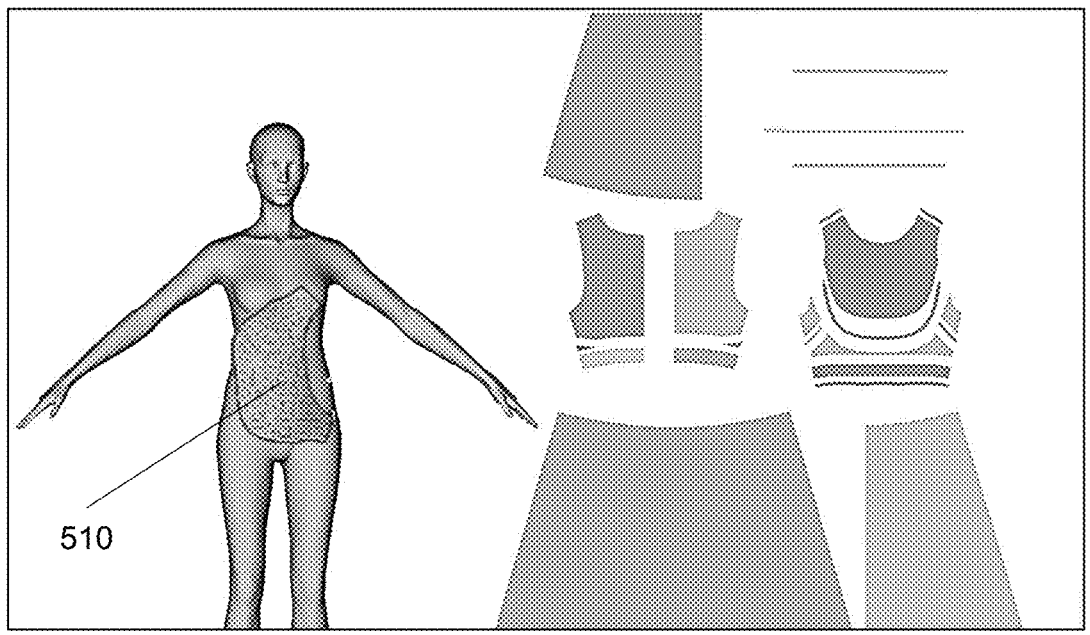
Figure 6A:
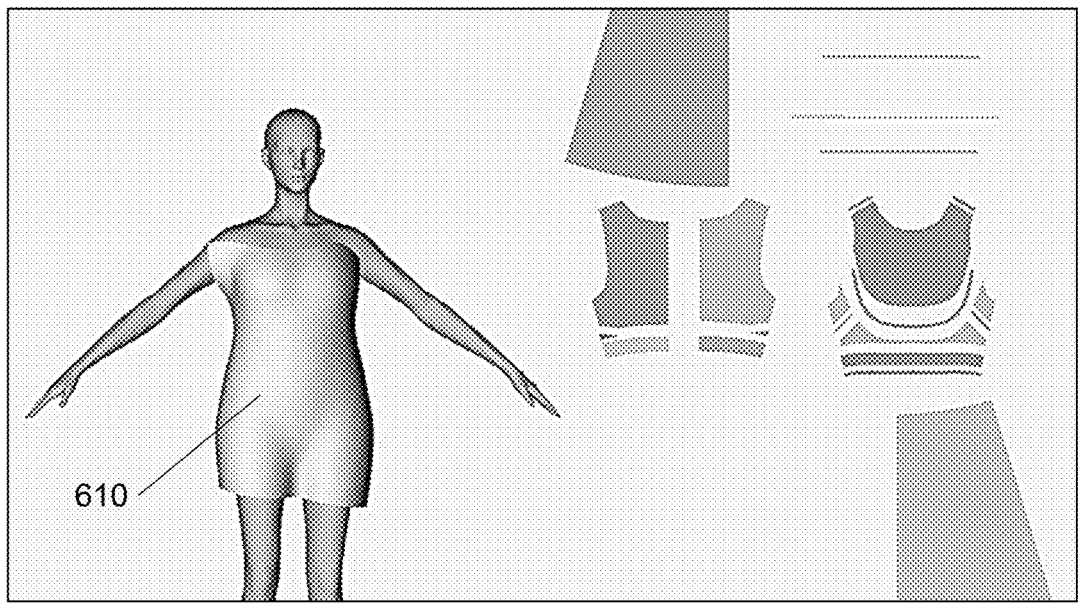
FIGS. 6A and 6B are schematic diagrams illustrating an exemplary 3D clothing pattern according to some embodiments of the present disclosure.
Figure 6B:
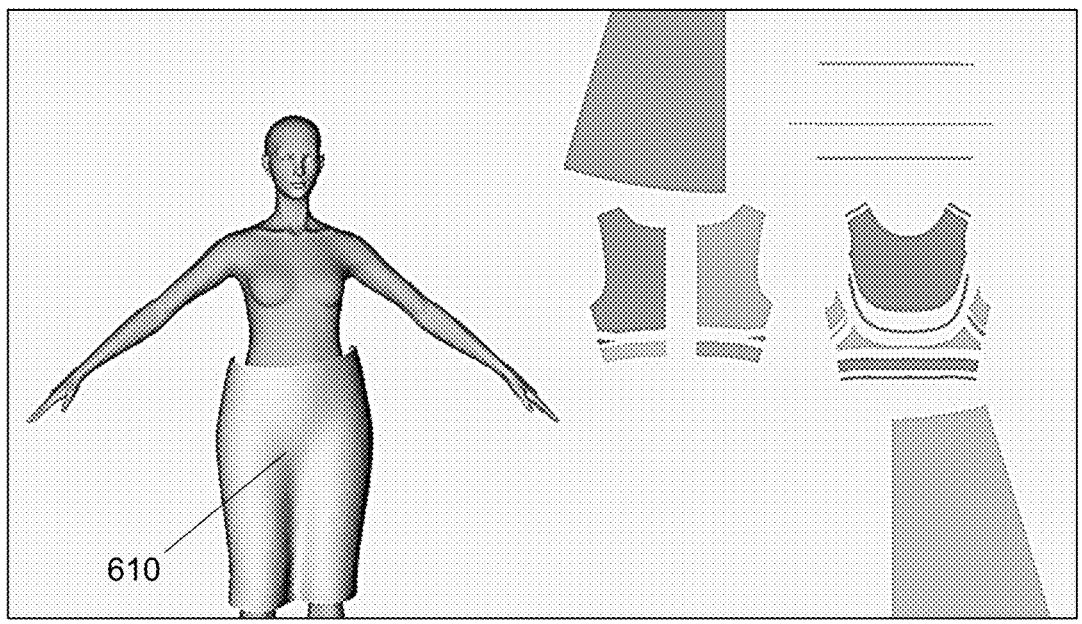

In some embodiments, after the 3D clothing pattern is displayed as a piece covering the 3D avatar, the user terminal 110 may receive a second instruction for adjusting the 3D clothing pattern. In response to the second user instruction, the 3D clothing pattern may be adjusted and user terminal 110 may display an adjusted 3D clothing pattern. For example, the user adjusts the distance information between the 3D clothing pattern and the 3D avatar via the parameter setting element. The sever determines new positions of the vertices of the geometric pattern on the 3D avatar based on the adjusted distance information. Further, the user terminal 110 displays the adjusted 3D clothing pattern on the 3D avatar based on the new positions of the vertices. As another example, an orientation of the 3D clothing pattern may be adjusted. FIGS. 5A and 5B are schematic diagrams illustrating an exemplary 3D clothing pattern 510 according to some embodiments of the present disclosure. As shown in FIGS. 5A and 5B, the orientation of the 3D clothing pattern 510 is adjusted from upward to rightward. As still another example, the position of the 3D clothing pattern may be adjusted according to needs. FIGS. 6A and 6B are schematic diagrams illustrating an exemplary 3D clothing pattern 610 according to some embodiments of the present disclosure. As shown in FIGS. 6A and 6B, the 3D clothing pattern 610 is dragged from the upper part of the 3D avatar to the lower part of the 3D avatar.

In some embodiments, the material of the 3D clothing pattern may be adjusted as a stiffer material to reduce self-intersect with other 3D clothing patterns, which can save computing resources for correcting self-intersection between 3D clothing patterns and improve design efficiency.

Figure 7A:
FIG. 7A is a schematic diagram illustrating an exemplary 3D virtual clothing worn on a 3D avatar according to some embodiments of the present disclosure.

In some embodiments, the user terminal 110 may further display a 3D virtual clothing worn on the 3D avatar. The 3D virtual clothing may be generated by sewing the 3D clothing pattern (or the adjusted 3D clothing pattern) and one or more other 3D clothing patterns that warp around the 3D avatar. Merely by way of example, 3D clothing patterns that are adjacent to each other may be sewed together to generate the 3D virtual clothing. For example, FIG. 7A is a schematic diagram illustrating an exemplary 3D virtual clothing 700 worn on a 3D avatar according to some embodiments of the present disclosure. As shown in FIG. 7A, the 3D virtual clothing 700 is generated by sewing 3D clothing patterns that are adjacent to each other.

In some embodiments, the server may determine a sewing relationship between the 3D clothing pattern and the one or more other 3D clothing patterns, and generate the 3D virtual clothing according to the sewing relationship. The user terminal 110 may receive and display the 3D virtual clothing on the 3D avatar. More descriptions regarding the determination of the sewing relationship may be found elsewhere in the present disclosure. See, e.g., operation 930 in FIG. 9 and relevant descriptions thereof.

In some embodiments, each time after a 2D clothing pattern is draped on the 3D avatar, the corresponding 3D clothing pattern may be sewed with one or more other 3D clothing patterns close to the 3D clothing pattern to generate the 3D virtual clothing. Alternatively, the 3D virtual clothing may be generated after all 2D clothing patterns are arranged on the 3D avatar. Alternatively, the user may need to input a user instruction for generating the 3D virtual clothing via the user terminal.

It should be noted that the processes 300 and the descriptions thereof are provided for the purposes of illustration, and not intended to limit the scope of the present disclosure. For persons having ordinary skills in the art, various modifications and changes in the forms and details of the application of the above method and system may occur without departing from the principles of the present disclosure. However, those variations and modifications also fall within the scope of the present disclosure.

In some embodiments, operation 310 may be omitted. Instead, the user may input a fourth user instruction for selecting the 2D clothing pattern and directing the user terminal 110 or the server to select the first target location on the 2D clothing pattern and the second target location on the 3D avatar. In other words, the first target location and the second target location are automatically determined by the server. Alternatively, the user may input a fifth user instruction for selecting the first target location on the 2D clothing pattern and directing the user terminal 110 or the server to determine the second target location. In other words, the first target location is designated by the user but the second target location is automatically determined by the server. More descriptions regarding the determination of the second target location via the server may be found elsewhere in the present disclosure. See, e.g., operation 910 in FIG. 9 and relevant descriptions thereof.

Figure 8:
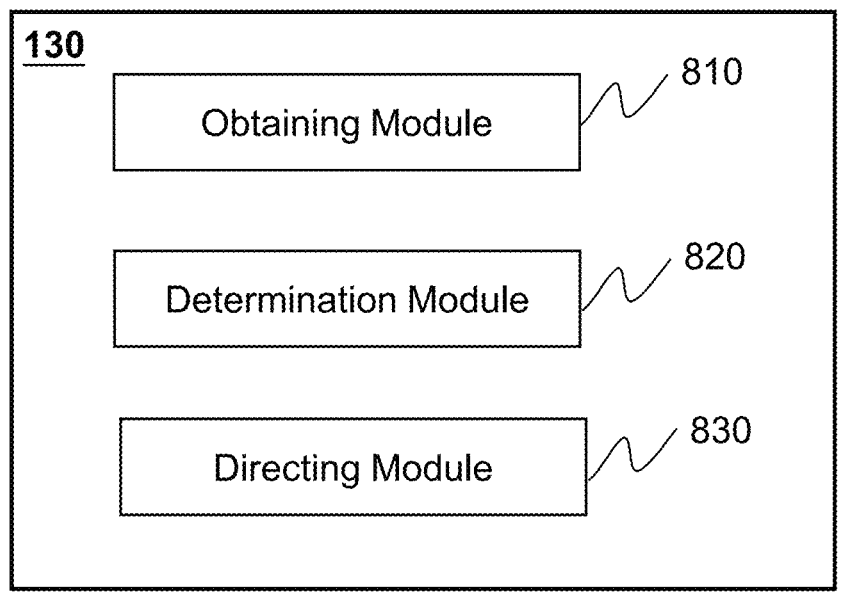
FIG. 8 is a block diagram illustrating an exemplary server according to some embodiments of the present disclosure.

FIG. 8 is a block diagram illustrating an exemplary server 130 according to some embodiments of the present disclosure.

As shown in FIG. 8, the server 130 may include an obtaining module 810, a determination module 820, and a directing module 830.

The obtaining module 810 may be configured to obtain an instruction for selecting a first target location from a 2D clothing pattern and allocating the 2D clothing pattern to a second target location on a 3D avatar, the 2D clothing pattern being represented by geometric pattern. More descriptions regarding the obtaining of the instruction may be found elsewhere in the present disclosure. See, e.g., operation 910 in FIG. 9, and relevant descriptions thereof.

The determination module 820 may be configured to determine positions of vertices of the geometric pattern on the 3D avatar based on the first target location and the second target location. More descriptions regarding the determination of the positions of the vertices of the geometric pattern on the 3D avatar may be found elsewhere in the present disclosure. Sec, e.g., operation 920 in FIG. 9, and relevant descriptions thereof.

The directing module 830 may be configured to direct a user terminal to represent the 2D clothing pattern as a 3D clothing pattern that warps around the 3D avatar at the second target location based on the positions of the vertices. More descriptions regarding the directing the user terminal to represent the 2D clothing pattern as the 3D clothing pattern may be found elsewhere in the present disclosure. See, e.g., operation 930 in FIG. 9, and relevant descriptions thereof.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, any one of the modules may be divided into two or more units. For instance, the determination module 820 may be divided into two units configured to determine different data. In some embodiments, the server 130 may include one or more additional modules, such as a storage module (not shown) for storing data.

Figure 9:
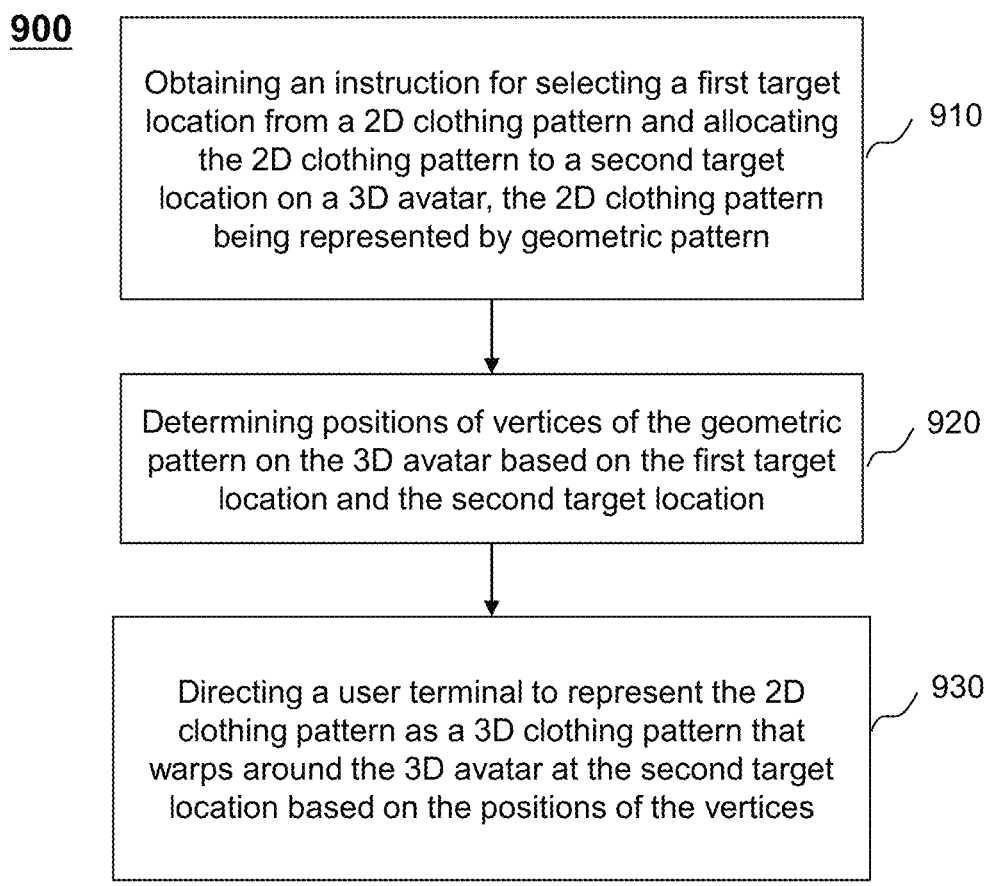
FIG. 9 is a flowchart illustrating an exemplary process for arranging clothing patterns according to some embodiments of the present disclosure.

FIG. 9 is a flowchart illustrating an exemplary process 900 for arranging clothing patterns according to some embodiments of the present disclosure. In some embodiments, the process 900 may be implemented by the server 130 of the fashion design system 100 illustrated in FIG. 1A. For example, the process 900 may be stored in a storage (e.g., the storage device 140) as a form of instructions, and invoked and/or executed by the server 130. The operations of the illustrated process presented below are intended to be illustrative. In some embodiments, the process 900 may be accomplished with one or more additional operations not described, and/or without one or more of the operations discussed. Additionally, the order in which the operations of the process 900 as illustrated in FIG. 9 and described below is not intended to be limiting.

In 910, the server 130 (e.g., the obtaining module 810) may obtain an instruction for selecting a first target location from a 2D clothing pattern and allocating the 2D clothing pattern to a second target location on a 3D avatar, the 2D clothing pattern being represented by geometric pattern.

In some embodiments, the instruction may be the first user instruction received from the user terminal 110, which is inputted by the user via the user terminal 110 as described in connection with operation 310. In some embodiments, the instruction may be a computer-generated instruction, that is, the instruction is generated by the server 130. For example, the user may input the fourth user instruction for selecting the 2D clothing pattern and directing the user terminal 110 to automatically arranging the 2D clothing pattern on the 3D avatar. As another example, the user may input the fifth user instruction for selecting the first target location on the 2D clothing pattern and directing the user terminal 110 to determine the second target location. The user terminal 110 may transmit the fourth user instruction or the fifth user instruction to the server 130, and the server 130 may generate the computer-generated instruction. Specifically, the server 130 may determine the first target location and/or the second target location for arranging the 2D clothing pattern.

The first target location may be any location on the 2D clothing pattern. For example, the server 130 randomly selects a point of the 2D clothing pattern as the first target location. As another example, the server 130 determines the center point of the 2D clothing pattern as the first target location. As another example, the server 130 determines a vertex of a mesh on the 2D clothing pattern as the first target location.

The second target location may be any location on the 3D avatar. In some embodiments, the second target location may be determined by performing the following operations. Specifically, the server 130 may determine a body part of the 3D avatar corresponding to the 2D clothing pattern, and further determine the second target location on the 3D avatar based on the body part corresponding to the 2D clothing pattern. As user herein, the 2D clothing pattern is predict to be worn on the determined body part of the 3D avatar corresponding to the 2D clothing pattern.

In some embodiments, the server 130 may determine the body part of the 3D avatar corresponding to the 2D clothing pattern by processing boundary information of the 2D clothing pattern using a trained machine learning model. The boundary information of the 2D clothing pattern may include the shape information, the size information, information relating to the sides (edges) that make up the 2D clothing pattern, or the like, or any combination thereof. The trained machine learning model may be a trained model for determining a body part of a 3D avatar corresponding to a 2D clothing pattern. Merely by way of example, the boundary information of the 2D clothing pattern may be input into the trained machine learning model, and the trained machine learning model may output the body part of the 3D avatar corresponding to the 2D clothing pattern. In some embodiments, the trained machine learning model may include a deep learning model. Exemplary deep learning models may include a convolutional recurrent neural network (CRNN) model, a deep neural network (DNN) model, a convolutional Neural Network (CNN) model, a recurrent neural network (RNN) model, a feature pyramid network (FPN) model, a generative adversarial network (GAN) model, or the like, or any combination thereof.

In some embodiments, the server 130 may obtain the trained machine learning model from one or more components of the fashion design system 100 (e.g., the storage device 140) or an external source via a network (e.g., the network 120). For example, the trained machine learning model may be previously trained by a computing device (e.g., the server 130), and stored in a storage device (e.g., the storage device 140) of the fashion design system 100. The server 130 may access the storage device and retrieve the trained machine learning model.

In some embodiments, the trained machine learning model may be generated by training a preliminary model based on a plurality of training samples. Each training sample may include a sample 2D clothing pattern (or boundary information of a sample 2D clothing pattern) and a reference body part of a 3D avatar corresponding to the sample 2D clothing pattern, wherein the reference body part can be used as a ground truth (also referred to as a label) for model training. In some embodiments, the reference body part may be determined by a user or may be automatically determined by a training device.

The preliminary model may include one or more model parameters, such as the number (or count) of layers, the number (or count) of nodes, a loss function, or the like, or any combination thereof. Before training, the preliminary model may have one or more initial parameter values of the model parameter(s).

The training of the preliminary model may include one or more iterations to iteratively update the model parameters of the preliminary model based on the training sample(s) until a termination condition is satisfied in a certain iteration. Exemplary termination conditions may be that the value of a loss function obtained in the certain iteration is less than a threshold value, that a certain count of iterations has been performed, that the loss function converges such that the difference of the values of the loss function obtained in a previous iteration and the current iteration is within a threshold value, etc. The loss function may be used to measure a discrepancy between a body part predicted by the preliminary model in an iteration and the reference body part. For example, the boundary information of the sample 2D clothing pattern of each training sample may be inputted into the preliminary model, and the preliminary model may output a predicted body part of the 3D avatar. The loss function may be used to measure a difference between the predicted body part and the reference body part of each training sample. Exemplary loss functions may include a focal loss function, a log loss function, a cross-entropy loss, a Dice ratio, or the like. If the termination condition is not satisfied in the current iteration, the server 130 may further update the preliminary model to be used in a next iteration according to, for example, a backpropagation algorithm. If the termination condition is satisfied in the current iteration, the server 130 may designate the preliminary model in the current iteration as the trained machine learning model.

After the body part corresponding to the 2D clothing pattern is determined, the server 130 may determine the second target location based on the body part. For example, the server 130 randomly selects a point from the body part as the second target location. As another example, the server 130 determines the center point of the body part as the second target location.

In 920, the server 130 (e.g., the determination module 820) may determine positions of vertices of the geometric pattern on the 3D avatar based on the first target location and the second target location.

In some embodiments, the server 130 may determine the positions of the vertices of the geometric pattern by solving an optimization function. For example, the optimization function may be represented by Equation (1) as below:

$$x = \underset{x}{\operatorname{argmin}} F^{init}(x), \quad (1)$$

where, x denotes a collection of the positions of the vertices of the geometric pattern on the 3D avatar, and $F^{init}(x)$ denotes an optimization term (also referred to as an optimization objective).

In some embodiments, the server 130 may determine the positions of the vertices of the geometric pattern on the 3D avatar by solving the optimization function using various solvers. Exemplary solvers may include a CPU-based preconditioned gradient descent solver, a nonlinear conjugate gradient solver, a nonlinear LBFGS solver, a GPU solver, or the like.

In some embodiments, the optimization function may at least include a first optimization term or a first constraint term relating to a difference between the distance from the position of each vertex to the 3D avatar and a desired distance corresponding to the vertex. For brevity, the distance between the position of a vertex to the 3D avatar is referred to as the distance corresponding to the vertex.

The first optimization term may be used to minimize the difference between the distance and the desired distance corresponding to each vertex. For example, the first optimization term may be represented by Equation (2) as below:

$$F^{dist}(x) = \frac{1}{2} \sum_i \max(n(x_i) \cdot \nabla \varphi(x_i), 0)(\varphi(x_i) - D_i)^2, \quad (2)$$

where, $F^{dist}(x)$ denotes the first optimization term, i denotes a serial number of a vertex, $x_i$ denotes a position of the vertex i on the 3D avatar, $n(x_i)$ denotes a vertex normal, $\varphi(x_i)$ denotes the distance (e.g., the signed distance) from the position of the vertex i to the 3D avatar, and $D_i$ denotes the desired distance corresponding to the vertex i. In Equation (2), it disables the body attraction of vertex i if it is facing toward the 3D avatar. This is to prevent the shape of the 3D clothing pattern from being stuck in a self-folded state, based on the assumption that the 2D clothing pattern should be facing outward.

The first constrain term may be used to constrain that the difference between the distance and the desired distance corresponding to each vertex satisfies a specific condition. For example, the difference between the distance and the desired distance corresponding to each vertex may be constrained to be smaller than a specific threshold (e.g., 0.2, 0.5 mm, etc.) or within a specific range (e.g., 0.1-0.2 mm) via the first constrain term.

In some embodiments, the desired distance corresponding to different vertices of the 2D clothing pattern may be the same. For example, the server 130 may determine a desired distance corresponding to the 2D clothing pattern, and assign the desired distance to each vertex. The desired distance corresponding to the 2D clothing pattern may be determined based on a type of the 2D clothing pattern, a material of the 2D clothing pattern, the body part of the 3D avatar corresponding to the 2D clothing pattern, the distance information between the 3D clothing pattern and the 3D avatar set by a user described in operation 320, or the like, or any combination thereof. As used herein, the type of the 2D clothing pattern refers to a type of a cloth produced using the 2D clothing pattern, such as a T-shirt, a suit, a bikini, a skirt, a pant, etc. The material of the 2D clothing pattern refers to a material (e.g., a Nylon, a cotton, a silk, etc.) of a cloth produced using the 2D clothing pattern. For example, the desired distance of a 2D clothing pattern corresponding to the suit may be greater than the desired distance of a 2D clothing pattern corresponding to bikini. As another example, the desired distance of a 2D clothing pattern corresponding to the arms may be smaller than the desired distance of a 2D clothing pattern corresponding to the waist. In some embodiments, the server 130 may directly designate the distance between the 3D clothing pattern and the 3D avatar set by the user described in operation 320 as the desired distance corresponding to the 2D clothing pattern.

In some embodiments, the desired distances corresponding to different vertices of the 2D clothing pattern may be different. For each vertex of the geometric pattern, the server 130 may determine the desired distance corresponding to the vertex based on the type of the 2D clothing pattern, the material of the 2D clothing pattern, the body part of the 3D avatar corresponding to the 2D clothing pattern, a body part of the 3D avatar corresponding to the vertex, the distance information between the 3D clothing pattern and the 3D avatar set by a user described in operation 320, or the like, or any combination thereof. For example, the server 130 may determine an initial desired distance corresponding to the 2D clothing pattern based on the type of the 2D clothing pattern, the material of the 2D clothing pattern, the body part of the 3D avatar corresponding to the 2D clothing pattern, or the like. Further, the server 130 may determine the desired distance corresponding to each vertex based on the initial desired distance corresponding to the 2D clothing pattern and body part of the 3D avatar corresponding to the vertex. As still another example, as described in operation 320, in some embodiments, the distance information may include distances between different portions of the 3D clothing pattern and the 3D avatar set by the user. The server 130 may determine a portion of the 3D clothing pattern where the vertex is located, and designate the distance between the portion of the 3D clothing pattern and the 3D avatar set by the user as the desired distance corresponding to the vertex. By setting different desired distances corresponding to different vertices, the 3D clothing pattern transformed from the 2D clothing pattern may be more realistic.

In some embodiments, the optimization function may further include a second optimization term or a second constraint term relating to the deformation of the 2D clothing pattern.

The second optimization term may be used to minimize a difference between shapes of the 2D clothing pattern and the 3D clothing pattern. In some embodiments, the second optimization term may include a plurality of second optimization sub-terms. For example, the second optimization term may be represented by Equation (3) as below:

$$F^{def}(x) = F^{def1}(x) + F^{def2}(x) \tag{3}$$

$$F^{def1}(x) = \sum_{(i,j) \in E} (\|x_i - x_j\| - L_{ij}^0)^2,$$

$$F^{def2}(x) = \sum_{e \in E'} x^T Q_e x$$

where, $F^{def}(x)$ denotes the second optimization term, $F^{def1}(x)$ denotes a second optimization sub-term, which is used to minimize a difference between a length of an edge of the 2D clothing pattern and a length of a corresponding edge of the 3D clothing pattern, $F_{def2}(x)$ denotes an another second optimization sub-term, which is used to minimize the curvature of the surface of the 3D clothing pattern, E denotes a spring edge set that includes all edges of the 2D clothing pattern, E' denotes a dihedral edge set that includes dihedral edges of the 2D clothing pattern (a dihedral edge refers to a common edge of two triangles), $L_{ij}^0$ denotes a reference length of a spring edge (i.e., a length of the spring edge on the 2D clothing pattern), and $Q_e$ denotes a quadratic bending matrix of a dihedral edge e.

In some embodiments, the second constrain term may be used to constrain that the deformation of the 2D clothing pattern satisfies a specific condition. In some embodiments, the deformation of the 2D clothing pattern includes a planar deformation and a bending deformation. The planar deformation and the bending deformation are constrained by different second optimization sub-terms. For example, the planar deformation is constrained by the second optimization sub-term $F^{def1}(x)$. The bending deformation is constrained by the second optimization sub-term $F^{def2}(x)$. For example, the planar deformation of the 2D clothing pattern may be constrained to be smaller than a specific threshold (e.g., 3%, etc.) via the second constraint sub-term $F^{def1}(x)$. The bending deformation of the 2D clothing pattern may be constrained to be smaller than a specific threshold (e.g., 5%, etc.) via the second constraint sub-term $F^{def2}(x)$. In some embodiments, the second constraint term may be generated based on an algorithm such as a position-based dynamics algorithm.

In some embodiments, the second optimization term may be generated based on a cotinuum-based model for planar deformation and a dihedral angle model for bending deformation.

In some embodiments, the optimization function may further include a third optimization term or a third constraint term relating to a distance between the second target location and a position of a target vertex corresponding to the first target location on the 3D avatar.

The target vertex corresponding to the first target location refers to a vertex on the 3D clothing pattern that is closest to the first target location.

The third optimization term may be used to minimize the distance between the second target location and the position of the target vertex on the 3D avatar. For example, the third optimization term may be represented by Equation (4) or Equation (5) as below:

$$F^{cent}(x) = \frac{1}{2}\|x_c - x_c^0\|^2, \tag{4}$$

$$F^{cent}(x) = \frac{1}{2}\|x_c - x_c^0\|_1^2, \tag{5}$$

where, $F^{cent}(x)$ denotes the third optimization term, $x_c$ denotes the position of the target vertex corresponding to the first target location on the 3D avatar, and $x_c^0$ denotes the second target location.

The third constrain term may be used to constrain that the distance between the second target location and the position of the target vertex on the 3D avatar satisfies a specific condition. For example, the distance between the second target location and the position of the target vertex on the 3D avatar may be constrained to be smaller than a specific threshold (e.g., 0.1 mm, etc.) via the third constraint term. As another example, the distance between the second target location and the position of the target vertex on the 3D avatar may be constrained to be 0 via the third constraint term.

In some embodiments, the optimization function may further include a fourth optimization term or a fourth constraint term relating to an orientation of the 3D clothing pattern transformed from the 2D clothing pattern.

The fourth optimization term may be used to minimize the difference between the orientation of the 3D clothing pattern and a desired orientation of the 3D clothing pattern. For example, the fourth optimization term may be represented by Equation (6) or Equation (7) as below:

$$F^{up}(x) = \frac{1}{2}\sum_i \text{Sign}\left((r_i - r_c)^T R(\theta)\begin{bmatrix}0\\1\end{bmatrix}\right)(x_i - x_c)^T\begin{bmatrix}0\\1\\0\end{bmatrix}, \tag{6}$$

$$F^{up}(x) = \frac{1}{2}\sum_i \left((r_i - r_c)^T R(\theta)\begin{bmatrix}0\\1\end{bmatrix}\right)(x_i - x_c)^T\begin{bmatrix}0\\1\\0\end{bmatrix}, \tag{7}$$

where, $F^{up}(x)$ denotes the fourth optimization term, $r_i$ denotes a 2D position of the vertex i in a 2D coordinate system corresponding to the 2D clothing pattern, $r_c$ denotes a 2D position of the target vertex corresponding to the first target location in the 2D coordinate system, and $R(\theta)$ denotes a 2D rotation matrix by an angle $\theta$. If the user does not rotate the 2D clothing pattern, the angle $\theta$ may be equal to 0 degrees by default, meaning that the 3D clothing pattern on the 3D avatar is desired to have the same orientation as the 2D clothing pattern (e.g., be oriented upward). If the user rotates the 2D clothing pattern, clockwise or counterclockwise, the angle $\theta$ may be equal to the rotation angle of the 2D clothing pattern, meaning that the 3D clothing pattern on the 3D avatar is desired to have the same orientation as the rotated 2D clothing pattern.

The fourth constrain term may be used to constrain that the difference between the orientation of the 3D clothing pattern and the desired orientation of the 3D clothing pattern satisfies a specific condition. For example, the difference between the orientation of the 3D clothing pattern and the desired orientation of the 3D clothing pattern may be constrained to be smaller than a specific threshold (e.g., 5°, 10°, etc.) via the fourth constraint term. As another example, the orientation of the 3D clothing pattern may be constrained to be the same as the desired orientation via the fourth constraint term.

In some embodiments, the optimization function may include one or more of the first optimization term (or the first constraint term), the second optimization term (or the second constraint term), the third optimization term (or the third constraint term), and the fourth optimization term (or the fourth constraint term).

In some embodiments, the optimization function may be a weighted sum of multiple optimization terms and/or constraint terms. For example, the optimization function may be represented by Equation (8) or Equation 9) as below:

$$x = \underset{x}{\operatorname{argmin}}(k^{cent}F^{cent}(x) + k^{up}F^{up}(x) + k^{dist}F^{dist}(x) + k^{def}F^{def}(x)), \quad (8)$$

$$x = \underset{x}{\operatorname{argmin}}(k^{cent}F^{up}(x) + k^{dist}F^{dist}(x) + k^{def}F^{def}(x)), \text{ subject to } C(x) \equiv 0, \quad (9)$$

where, $k^{cent}$ denotes the weight of the first optimization term, $k^{up}$ denotes the weight of the second optimization term, $k^{dist}$ denotes the weight of the third optimization term, $k^{def}$ denotes the weight of the fourth optimization term, $C(x)$ denotes the fourth constraint term. In some embodiments, if the second optimization term include the plurality of second optimization sub-terms, $k^{def}$ may include a plurality of weights each of which corresponds to one of the second optimization sub-terms.

In some embodiments, the weights of the optimization terms and/or constraint terms may be set manually by a user (e.g., a designer) according to needs or a default setting of the fashion design system 100.

In some embodiments, the weights of the optimization terms and/or constraint terms may be determined based on at least one of the type of the 2D clothing pattern or a body part of the 3D avatar corresponding to the 2D clothing pattern. As described elsewhere in the present disclosure, the type of the 2D clothing pattern refers to a type of a cloth produced using the 2D clothing pattern, such as a T-shirt, a suit, a bikini, a skirt, a pant, etc. For example, if the cloth produced using the 2D clothing pattern is a bikini, the weight of the first optimization term or the first constraint term may be relatively small since the bikini needs to be close to the body. As another example, if the cloth produced using the 2D clothing pattern is a skirt and the body part of the 3D avatar corresponding to the 2D clothing pattern is a leg, the weight of the first optimization term or the first constraint term may be relatively large since a portion of the skirt corresponding to the leg needs to have a big hem. Since different types of clothes or clothes worn on different body parts have different characteristics, by considering the type of the 2D clothing pattern or the body part of the 3D avatar corresponding to the 2D clothing pattern, the accuracy of the weights of the optimization terms and/or constraint terms may be greatly improved, thereby improving the accuracy of the optimization function.

In some embodiments, if the optimization function includes one or more constraint terms, solving the optimization function becomes a constrained optimization problem. In such cases, the optimization function may be solved by constrained optimization algorithms, such as a primal-dual formulation algorithm, or a projected gradient descent algorithm, etc.

According to some embodiments of the present disclosure, the optimization function may be generated according to multiple optimization terms or constraint terms. The optimization terms or constraint terms relate to different aspects of the arrangement of the 2D clothing pattern. For example, the first optimization term or the first constraint term can make the distance between the 3D clothing pattern and the 3D avatar more consistent with the actual situation when the cloth is worn. Therefore, the positions of the vertices of the geometric pattern on the 3D avatar determined by solving the optimization function may be relatively accurate. Moreover, in some embodiments, the optimization function may be the weighted sum of multiple optimization terms and/or constraint terms, which may improve the accuracy of the optimization function, thereby improving the accuracy of the positions of the vertices of the geometric pattern on the 3D avatar.

In 930, the server 130 (e.g., the directing module 830) may direct a user terminal to represent the 2D clothing pattern as a 3D clothing pattern that warps around the 3D avatar at the second target location based on the positions of the vertices.

In some embodiments, the user terminal 110 may receive the positions of the vertices of the geometric pattern on the 3D avatar from the server 130, and represent the 2D clothing pattern as the 3D clothing pattern by translating the vertices of the geometric pattern based on the positions of the vertices. In some embodiments, the server may generate the 3D clothing pattern by translating the vertices of the geometric pattern based on the positions of the vertices, and send the 3D clothing pattern to the user terminal 110 for display. More descriptions regarding the displaying of the 3D clothing pattern via the user terminal 110 based on the positions of the vertices may be found elsewhere in the present disclosure. Sec, e.g., operation 320 in FIG. 2 and relevant descriptions thereof.

Figure 7B:
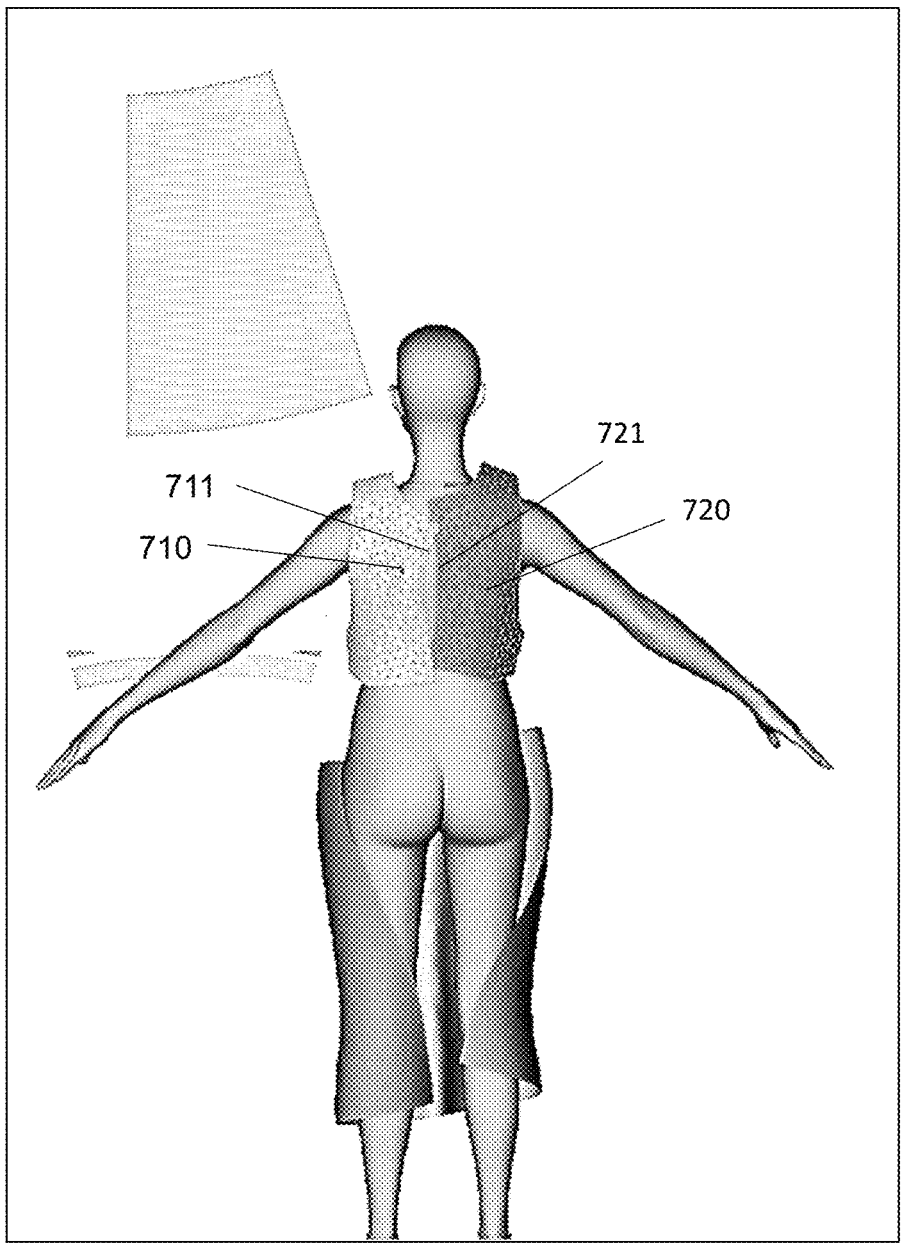
FIG. 7B is a schematic diagram illustrating exemplary 3D clothing patterns according to some embodiments of the present disclosure.

In some embodiments, the server 130 may determine a sewing relationship between the 3D clothing pattern (or the adjusted 3D clothing pattern) and one or more other 3D clothing patterns that warp around the 3D avatar. Further, the server 130 may direct the user terminal 110 to display a 3D virtual clothing worn on the 3D avatar. The 3D virtual clothing may be generated by sewing the 3D clothing pattern and the one or more other 3D clothing patterns based on the sewing relationship. The sewing relationship may indicate that two sides of different 3D clothing patterns are adjacent to each other and need to be sewed together. For example, FIG. 7B is a schematic diagram illustrating exemplary 3D clothing patterns 710 and 720 according to some embodiments of the present disclosure. As shown in FIG. 7B, the sewing relationship of the 3D clothing patterns 710 and 720 indicates two adjacent sides 711 and 721 of the 3D clothing patterns 710 and 720 need to be sewed together.

As described elsewhere in the present disclosure, in conventional clothing pattern arrangement approaches, since the amount of pre-defined body locations corresponding to the selected clothing pattern is relatively small, the body parts that the user can choose to arrange the clothing pattern are relatively limited. Moreover, the shape of the clothing pattern is determined by projecting the clothing pattern from a reference pattern space onto a pre-defined planar or cylindrical surface, which may cause unconformity between the clothing pattern and the 3D avatar, and the self-intersection between clothing patterns.

Compared with the conventional clothing pattern arrangement approaches, according to some embodiments of the present disclosure, the clothing patterns may be allowed to be arranged on any location of the 3D avatar, which makes the arrangement of clothing patterns more flexible. Moreover, the 3D clothing patterns may be tightly wrapped around the 3D avatar, which may reduce the self-intersection between 3D clothing patterns.

It should be noted that the processes 300 and the descriptions thereof are provided for the purposes of illustration, and not intended to limit the scope of the present disclosure. For persons having ordinary skills in the art, various modifications and changes in the forms and details of the application of the above method and system may occur without departing from the principles of the present disclosure. However, those variations and modifications also fall within the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an subject oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate a certain variation (e.g., ±1%, ±5%, ±10%, or ±20%) of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable. In some embodiments, a classification condition used in classification or determination is provided for illustration purposes and modified according to different situations. For example, a classification condition that "a value is greater than the threshold value" may further include or exclude a condition that "the probability value is equal to the threshold value."

What is claimed is:

1. A method for arranging clothing patterns, implemented on a user terminal having at least one processor and at least one storage device, the method comprising:
    receiving a first user instruction for selecting a first target location from a two-dimensional (2D) clothing pattern and allocating the 2D clothing pattern to a second target location on a three-dimensional (3D) avatar, wherein the first user instruction is inputted by a user by clicking the first target location on the 2D clothing pattern and dragging the 2D clothing pattern to the second target location on the 3D avatar, and the second target location is freely selected by the user on the 3D avatar; and
    in response to the first user instruction, changing the 2D clothing pattern depending on the body shape of the 3D avatar and representing the 2D clothing pattern as a 3D clothing pattern that warps around and conforms to the 3D avatar at the second target location.

2. The method of claim 1, further comprising:
    displaying a plurality of candidate 2D clothing patterns for user selection.

3. The method of claim 1, further comprising:
    receiving a second user instruction for adjusting the 3D clothing pattern; and
    in response to the second user instruction, displaying an adjusted 3D clothing pattern.

4. The method of claim 1, further comprising:
    displaying a 3D virtual clothing worn on the 3D avatar, wherein the 3D virtual clothing is generated by sewing the 3D clothing pattern and one or more other 3D clothing patterns that warp around the 3D avatar.

5. The method of claim 1, further comprising:
    receiving a third user instruction for setting distance information between the 3D clothing pattern and the 3D avatar, wherein the 3D clothing pattern is represented based on the distance information.

6. The method of claim 5, the distance information including different desired distances between different portions of the 3D clothing pattern and the 3D avatar.

7. The method of claim 1, wherein the 2D clothing pattern is represented by a geometric pattern, and the representing the 2D clothing pattern as a 3D clothing pattern that warps around the 3D avatar at the second target location comprises:
    determining positions of vertices of the geometric pattern on the 3D avatar based on the first target location and the second target location, a position of each vertex on the 3D avatar referring to a position of the vertex in a 3D coordinate system corresponding to the 3D avatar; and
    representing the 2D clothing pattern as the 3D clothing pattern by translating the vertices of the geometric pattern based on the positions of the vertices.

8. The method of claim 7, wherein the positions of the vertices of the geometric pattern on the 3D avatar are determined by solving an optimization function, the optimization function at least including a first optimization term or a first constraint term relating to a difference between the distance from the position of each vertex to the 3D avatar and a desired distance corresponding to the vertex.

9. The method of claim 8, wherein the desired distance corresponding to each vertex is determined based on at least one of a type of the 2D clothing pattern, a body part of the 3D avatar corresponding to the 2D clothing pattern, a body part of the 3D avatar corresponding to the vertex, or distance information between the 3D clothing pattern and the 3D avatar set by a user.

10. The method of claim 8, wherein the optimization function further comprises a second optimization term or a second constraint term relating to the deformation of the 2D clothing pattern.

11. The method of claim 8, wherein the optimization function further comprises a third optimization term or a third constraint term relating to a distance between the second target location and a position of a target vertex corresponding to the first target location.

12. The method of claim 8, wherein the optimization function further comprises a fourth optimization term or a fourth constraint term relating to an orientation of the 3D clothing pattern.

13. The method of claim 7, wherein the method further comprises:
    receiving a second user instruction for adjusting the 3D clothing pattern;
    in response to the second instruction, determining new positions of the vertices of the geometric pattern on the 3D avatar; and
    instantly displaying an adjusted 3D clothing pattern that warps around and conforms to the 3D avatar based on the new positions of the vertices.

14. The method of claim 1, the 2D clothing pattern is represented by a geometric pattern, and the representing the 2D clothing pattern as a 3D clothing pattern that warps around the 3D avatar at the second target location comprises:
    transmitting the first user instruction to a server;
    receiving, from the server, positions of vertices of the geometric pattern on the 3D avatar; and
    representing the 2D clothing pattern as the 3D clothing pattern by translating the vertices of the geometric pattern based on the positions of the vertices.

15. The method of claim 1, wherein the 2D clothing pattern is represented by a geometric pattern, and the representing the 2D clothing pattern as a 3D clothing pattern that warps around the 3D avatar at the second target location comprises:
    determining positions of vertices of the geometric pattern on the 3D avatar based on the first target location and the second target location by solving an optimization function; and
    representing the 2D clothing pattern as the 3D clothing pattern by translating the vertices of the geometric pattern based on the positions of the vertices, wherein the optimization function includes:
        an optimization term or a constraint term relating to a distance between the second target location and a position of a target vertex corresponding to the first target location; and/or
        an optimization term or a constraint term relating to an orientation of the 3D clothing pattern.

16. A user device, comprising:
    at least one storage device storing a set of instructions for arranging clothing patterns; and
    at least one processor configured to communicate with the at least one storage device, wherein when executing the set of instructions, the at least one processor is configured to direct the user device to perform operations including:

receiving a first user instruction for selecting a first target location from a two-dimensional (2D) clothing pattern and allocating the 2D clothing pattern to a second target location on a three-dimensional (3D) avatar, wherein the first user instruction is inputted by a user by clicking the first target location on the 2D clothing pattern and dragging the 2D clothing pattern to the second target location on the 3D avatar, and the second target location is freely selected by the user on the 3D avatar; and in response to the first user instruction, changing the 2D clothing pattern depending on the body shape of the 3D avatar and representing the 2D clothing pattern as a 3D clothing pattern that warps around and conforms to the 3D avatar at the second target location.

17. A method for arranging clothing patterns, implemented on a server having at least one processor and at least one storage device, the method comprising:

obtaining an instruction for selecting a first target location from a two-dimensional (2D) clothing pattern and allocating the 2D clothing pattern to a second target location on a three-dimensional (3D) avatar, the 2D clothing pattern being represented by geometric pattern;

determining positions of vertices of the geometric pattern on the 3D avatar based on the first target location and the second target location by solving an optimization function; and directing a user terminal to represent the 2D clothing pattern as a 3D clothing pattern that warps around the 3D avatar at the second target location based on the positions of the vertices, wherein the optimization function includes:

an optimization term or a constraint term relating to a distance between the second target location and a position of a target vertex corresponding to the first target location; and/or an optimization term or a constraint term relating to an orientation of the 3D clothing pattern.

18. The method of claim 17, wherein the instruction is inputted by a user via a user terminal by clicking the first target location on the 2D clothing pattern and dragging the 2D clothing pattern to the second target location on the 3D avatar, and the second target location is freely selected by the user on the 3D avatar.

19. The method of claim 17, wherein the instruction is a computer-generated instruction, and the second target location is determined by:

determining a body part of the 3D avatar corresponding to the 2D clothing pattern by processing boundary information of the 2D clothing pattern using a trained machine learning model; and determining the second target location on the 3D avatar based on the body part corresponding to the 2D clothing pattern.

20. The method of claim 17, further comprising:

determining a sewing relationship between the 3D clothing pattern and one or more other 3D clothing patterns that warp around the 3D avatar; and directing the user terminal to display a 3D virtual clothing worn on the 3D avatar, wherein the 3D virtual clothing is generated by sewing the 3D clothing pattern and the one or more 3D clothing patterns based on the sewing relationship.

* * * * *